United States Patent
Park

(10) Patent No.: US 11,112,097 B2
(45) Date of Patent: Sep. 7, 2021

(54) MAGNETIC LIGHT PANEL SYSTEM

(71) Applicant: Dan Park, Buena Park, CA (US)

(72) Inventor: Dan Park, Buena Park, CA (US)

(*) Notice: Subject to any disclaimer, the term of this patent is extended or adjusted under 35 U.S.C. 154(b) by 0 days.

(21) Appl. No.: 16/829,255

(22) Filed: Mar. 25, 2020

(65) Prior Publication Data
US 2021/0025576 A1    Jan. 28, 2021

Related U.S. Application Data

(60) Provisional application No. 62/823,176, filed on Mar. 25, 2019.

(51) Int. Cl.
| | |
|---|---|
| *F21V 17/00* | (2006.01) |
| *F21V 21/096* | (2006.01) |
| *F21V 17/02* | (2006.01) |
| *F21L 4/00* | (2006.01) |
| *F21W 106/00* | (2018.01) |
| *F21V 17/10* | (2006.01) |

(52) U.S. Cl.
CPC .......... *F21V 21/0965* (2013.01); *F21L 4/00* (2013.01); *F21V 17/02* (2013.01); *F21V 17/105* (2013.01); *F21W 2106/00* (2018.01)

(58) Field of Classification Search
CPC .... F21V 21/096; F21V 21/0965; F21V 17/02; F21L 4/08; F21L 4/00; F21L 4/027; F21W 2106/00; B60Q 1/268; B60J 1/00
See application file for complete search history.

(56) References Cited

U.S. PATENT DOCUMENTS

| | | | | |
|---|---|---|---|---|
| 7,946,301 B1* | 5/2011 | Walsh | ..................... | B60S 1/268 134/123 |
| 2007/0103922 A1* | 5/2007 | Rissmiller | ............... | B60Q 1/50 362/499 |
| 2011/0154601 A1* | 6/2011 | Tong | ......................... | B60S 1/30 15/220.2 |
| 2018/0320839 A1* | 11/2018 | Briscoe | ................. | F21V 21/096 |
| 2020/0340636 A1* | 10/2020 | Bertken | .................... | F21K 9/20 362/102 |

* cited by examiner

*Primary Examiner* — Y M. Quach Lee
(74) *Attorney, Agent, or Firm* — Cionca IP Law P.C.; Marin Cionca

(57) ABSTRACT

A magnetic light panel system having a light panel with a light source that can be connected to a power source and thus illuminated, and further having a handle. The light panel and the handle may each be provided with magnets such that the light panel and the handle can be magnetically associated with each other from opposite sides of a window or windshield. The panel may be manipulated or adjusted by a user on a vehicle exterior while the light panel remains on the vehicle interior, and the light panel may provide light to the user such that the borders and edges along a window or windshield can be more easily seen. Additionally, the panel may be provided with a guideline having a zigzag or jagged shape along the border to provide the user with a reference point or measurement point.

16 Claims, 15 Drawing Sheets

MAGNETIC LIGHT PANEL SYSTEM

CROSS-REFERENCE TO RELATED APPLICATIONS

This application claims the benefit of U.S. Provisional Application No. 62/823,176, filed Mar. 25, 2019, which is hereby incorporated by reference, to the extent that it is not conflicting with the present application.

BACKGROUND OF INVENTION

1. Field of the Invention

The invention relates generally to auto detailing, maintenance, and modification, and more specifically to lighting for glass and window tinting or other similar work.

2. Description of the Related Art

Window tinting is a popular choice for many automobile and vehicle owners and drivers. To tint windows, generally, a film is applied to the windows of a car or other vehicle. An important step in the process of applying a film is the trimming of the film to precisely match the size and shape of the window. When trimming the film, the film is often placed on the exterior side of the window, and then can be hand-cut to size, before application of the film to the interior side of the window. If the film is to be hand-cut, a light source may be used inside of the car to be able to see the edges of the film during the cutting process. However, it may be difficult to see some areas of the film, particularly in corners and edges, due to the light being unable to reach these areas. It can hinder the process of cutting the film when visibility is low for a person installing the film, because for proper installation and application of the film, the cutting must be precise. Because the windows and windshield of a vehicle may be provided with a black matrix 1112 along their borders, it may be difficult for a user to visualize where a window tinting film should be cut, without a proper light source. In addition, the darker color of the window tinting film itself may also cause difficulties for the user attempting to visualize where cuts should be made. In low light, it can also be difficult for the user to gauge how deep the film should go into the edge of the window. Another problem is that a second person can assist by shining a light or an additional light source into the low visibility or low light areas, but this can cause difficulties since some people may need to or require working alone due to time constraints, accessibility of a second person, or any other similar reasons. Another problem is that a person may shine a light source in the low visibility or low light areas but may need to periodically move back and forth between the interior and exterior of the car in order to adjust the light source when working along the edges of the film.

Thus, there is a need for solutions to the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a magnetic light panel system is provided, having a flat panel that can be connected to a power source and thus illuminated, to provide a light source, and further having a handle. The panel and the handle may each be provided with magnets such that the panel and the handle can be magnetically associated with each other from opposite sides of a window or windshield. The panel may be manipulated or moved by a user on a vehicle exterior while the panel remains on the vehicle interior, and the panel may provide light to the user such that the borders and edges along a window or windshield can be more easily seen. The handle may be provided with a soft fabric cover. The panel may be provided with a guideline having a zigzag or jagged shape along the border to provide the user with a reference point or measurement point. The panel may also further be provided with a power cord that can be plugged into a vehicle, or any other suitable power source. Thus, an advantage is that a user performing a task wherein the borders of a window need to be clearly seen such as cutting a window tinting film can be provided with a light source along the edges of the window. The panel may also be magnetically moved via the handle placed on the vehicle exterior side and the user may thus put the light source where needed. Another advantage is that crevices, edges, and other hard-to-see areas may be provided with a light source. Another advantage is that the light source may be easily moved by the user such that no further assistance from other persons may be needed. Another advantage is that the guideline may help the user to gauge the depth of the window and thus determine the size and shape of the window film that is needed and make the appropriate cuts. Another advantage is that the cover may help to protect the glass of the vehicle from scratches. Another advantage is that the system may be light and portable and may be powered by the vehicle such that an additional power source is not needed when using the system within a vehicle. Another advantage is that the system may provide the user with multiple or various ways of powering the system. Another advantage is that the flat shape of the panel may make it possible for the panel to slide into and reach hard-to-access areas and provide light in such areas. Another advantage is that the light panel can also aid in showing the user obstructions along the border where it isn't visible.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
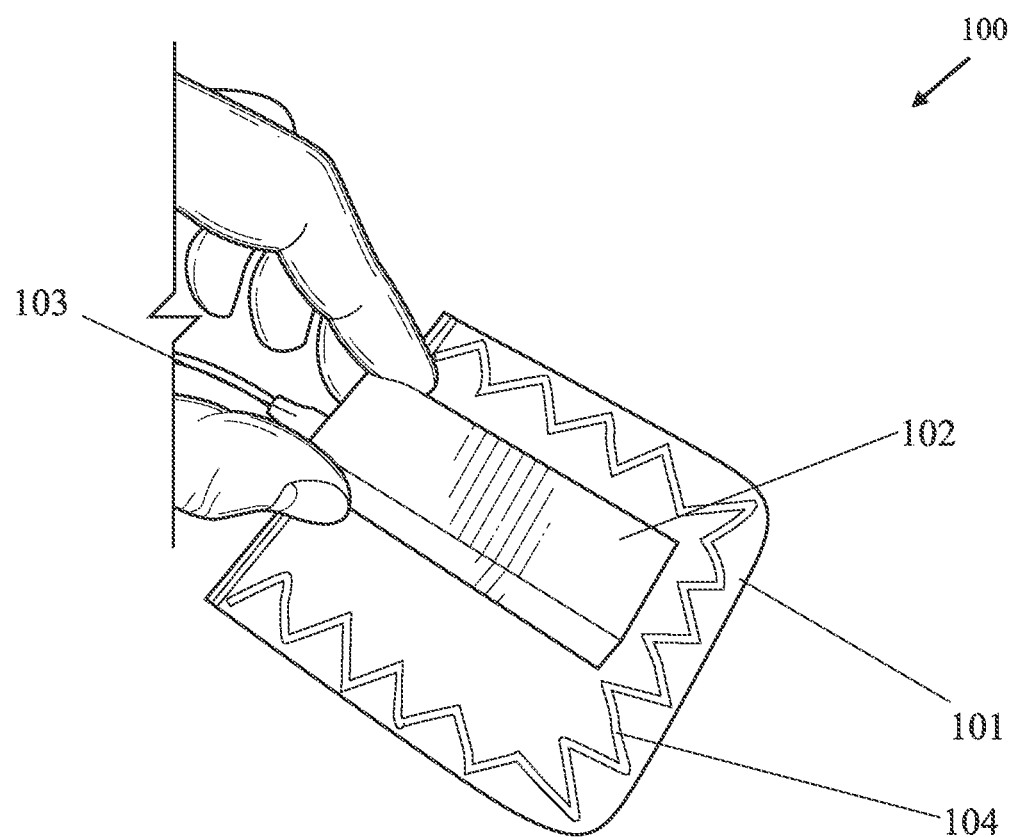
FIG. 1 shows a top perspective view of a magnetic light panel system having an illuminating panel and a handle, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 shows a top perspective view of a magnetic light panel system 100 having an illuminating panel ("illuminating panel," "flat panel", "light panel," or "panel") 101 and a handle ("magnetic handle," or "handle") 102, according to an aspect. The panel 101 may be provided with a power cord ("power cord," or "cord") 103 to power the light source of the panel, and a guideline 104, which may have a jagged or zigzag pattern. As shown by FIG. 1, the magnetic properties of the panel 101 and the handle 102 may allow for the panel 101 to be magnetically attracted to and held up by the handle 102. As an example, the light source provided by the panel 101 may, for example, be LED lights, or any other suitable lights.

Figure 2A:
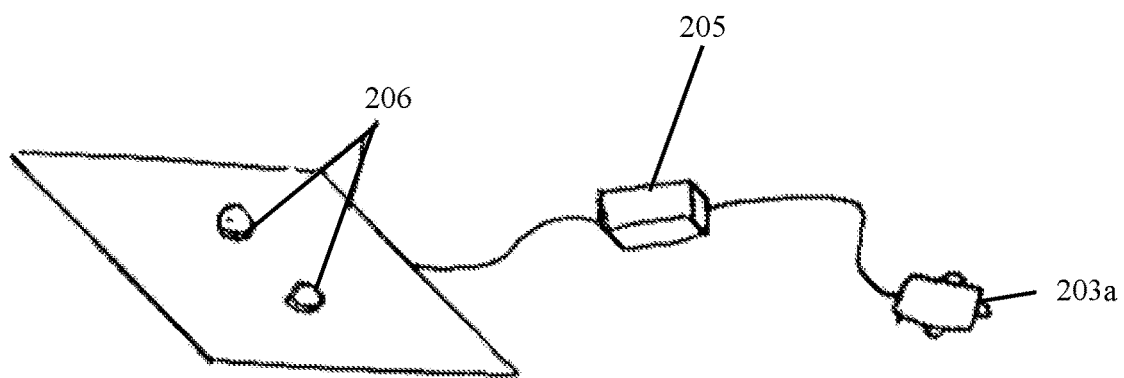
FIGS. 2A-2C show a perspective view, an example of a top view, and another example of a top view, respectively, of an illuminating panel, which may be used in a magnetic light panel system, according to an aspect.
Figure 2B:
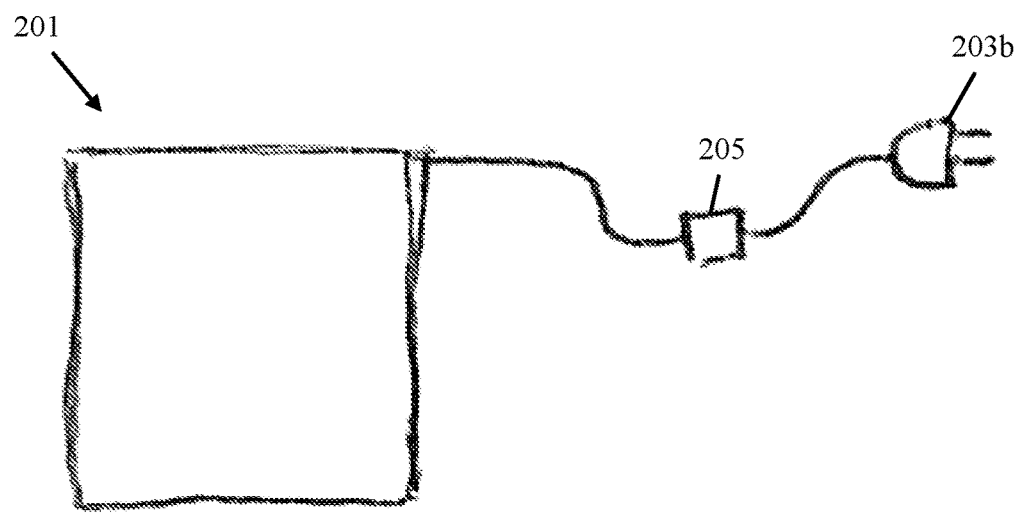
Figure 2C:
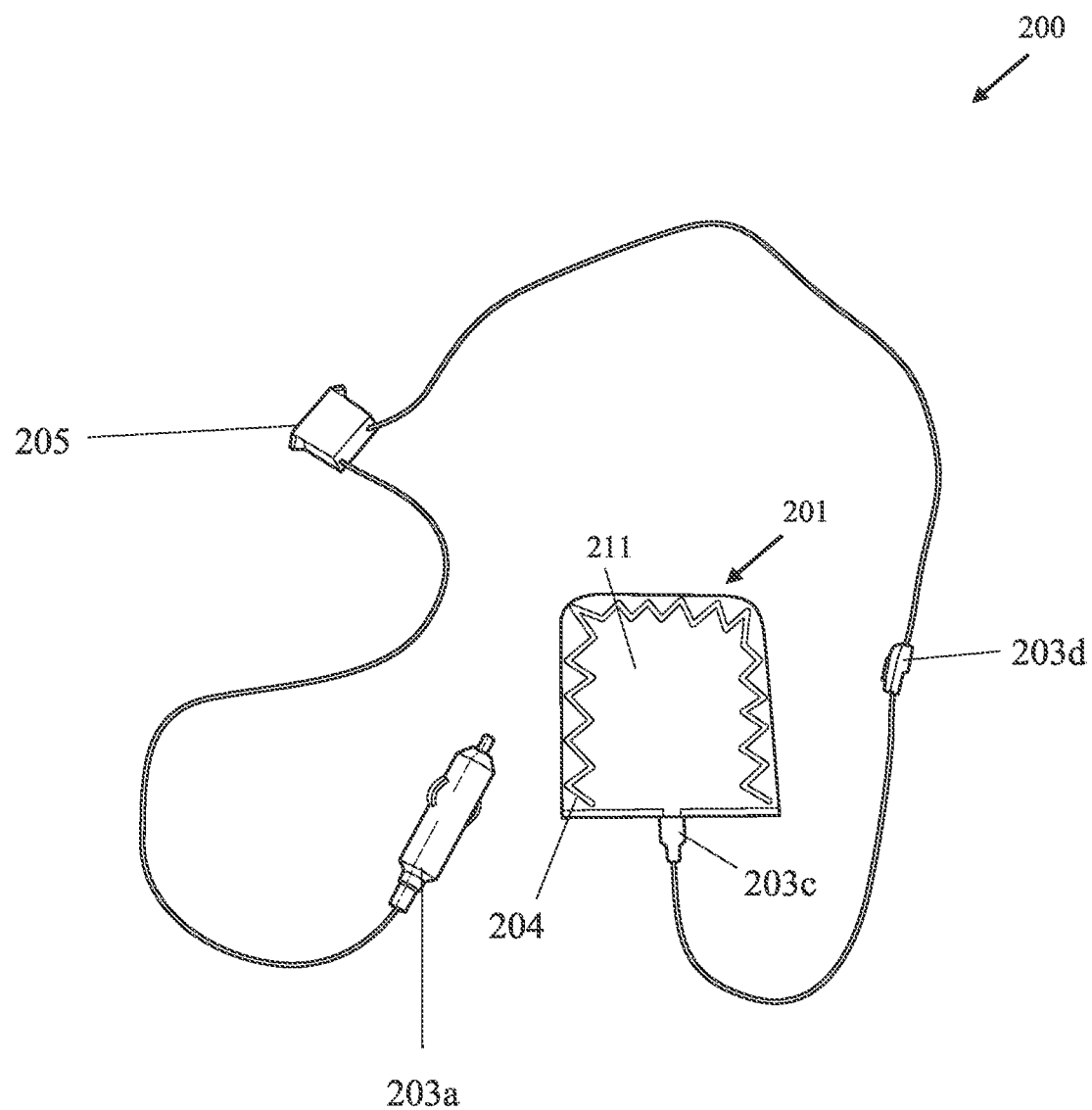

FIGS. 2A-2C show a perspective view, an example of a top view, and another example of a top view, respectively, of an illuminating panel 201, which may be used in a magnetic light panel system ("magnetic light panel system," "magnetic light system," or "system") 200, according to an aspect. As an example, the power cord 203a-d may be provided with a power inverter 205. As shown as an example in FIGS. 2A and 2C, the cord 203 may be provided with a car cigarette lighter plug 203a. As shown as another example in FIG. 2B, the cord 203a-d may be provided with any suitable standard electrical outlet plug 203b. The power cord 203a-d may connect to or be associated with the panel 201 via any suitable electrical port or connection 203c, such as, for example, micro USB, or any other similar suitable connection. Again, the panel 201 may be provided with a zigzag guideline 204. The illuminating panel 201 may also have a clear protective film applied to the top side to shield the guideline 204 from additional wear. The clear protective film may also protect the light panel 201 from scratches and other damage from use. The clear film may also be used to attach the magnets 206, shown in FIG. 2A, to the back side of the light panel 201.

In another example, the illuminating panel 201 may be powered by a battery pack. For example, the battery pack may use batteries that may be rechargeable or may be disposable. This may allow the system to be used wirelessly, which may allow for easier mobility while moving the illuminating panel 201 with the handle during tint cutting.

The magnetic light panel system 200 may have a flat panel 201 that can be connected to a power source and thus illuminated, to provide a light source 211. For example, the illuminating panel 201 may be an electroluminescent panel, meaning the entire panel illuminates and is the light source 211. In another example, the light source 211 may be LED lights within the illuminating panel 201, which may illuminate the panel by lighting the material with a central light.

Figure 3A:
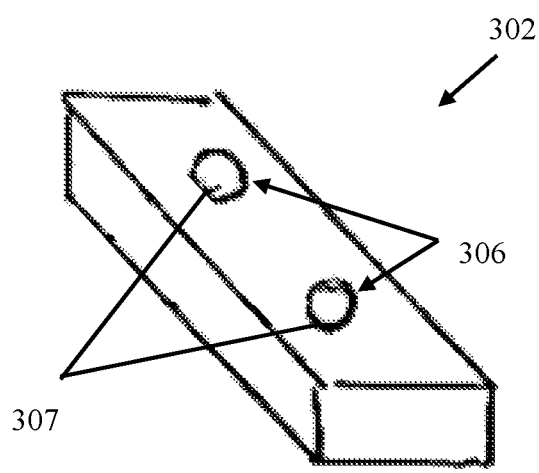
FIGS. 3A-3C show a bottom perspective view, a top perspective view, and a bottom perspective view, respectively, of a handle, which may be used in a magnetic light panel system, according to an aspect.
Figure 3B:
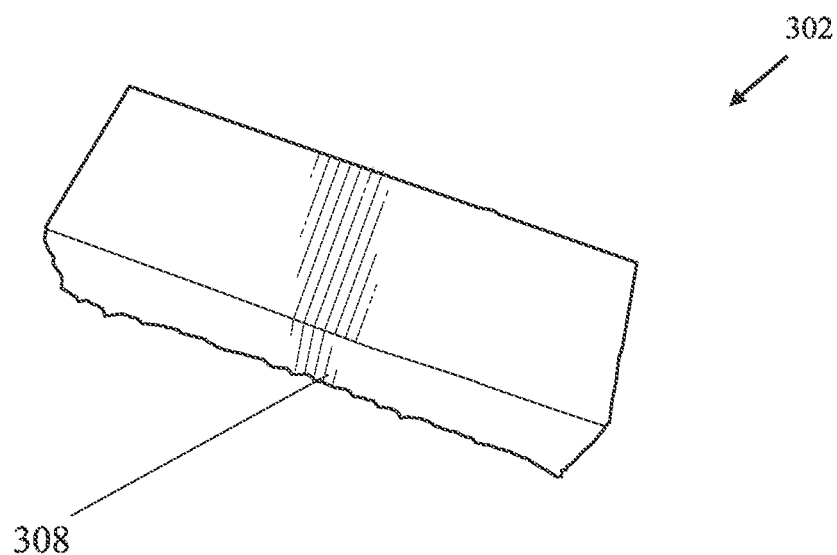
Figure 3C:
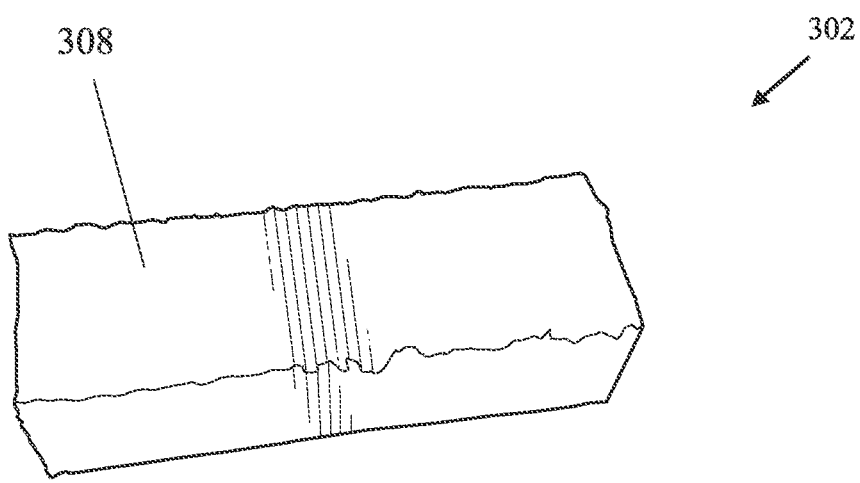

FIGS. 3A-3C show a bottom perspective view, a top perspective view, and a bottom perspective view, respectively, of a handle 302, which may be used in a magnetic light panel system, according to an aspect. FIG. 3A shows the handle 302 in an uncovered state, such that magnets 306 may be visible. For example, the handle 302 may be made of materials such as wood, plastic, or rubber. The bottom side of the handle 302 may be provided with holes or grooves as shown by 307, into which the magnets 306 may be inserted. The magnets 306 may be attached into the grooves 307 by any suitable means, or as another example, the magnets 306 may be held in place by the installation of a covering 308. Additionally, the handle 302 would have a top surface and a bottom surface opposite the top surface and the bottom surface may have the magnets 306 and cover 308 attached. FIGS. 3B-3C shown the handle 302 in a covered state, wherein a cover 308 is applied to the bottom side of the handle 302. An advantage of the cover 308 is that it may help protect the glass of the car because the cover 308 may be made from a soft material. Furthermore, the cover 308 may prevent scratches or any other damage when the handle 302 is being skimmed across the surface of the windshield or other windows of a vehicle. The cover 308 may additionally provide scratch protection for the tinting film while the handle 302 is gliding over the film. For example, the cover 308 may be felt or fabric to provide the scratch preventing benefits as described herein.

In an example, the handle 302 may be a solid piece of material. The material may be cut to the desired size and then dipped in a rubberized coating for a better grip and better aesthetics. Then, the grooves 307 may be formed on the bottom surface deep enough to fit the magnets 306 into. The magnets 306 may be, for example, glued into place. The cover 308, for example, may be glued to the bottom surface after the magnets 306 have been attached.

Figure 4A:
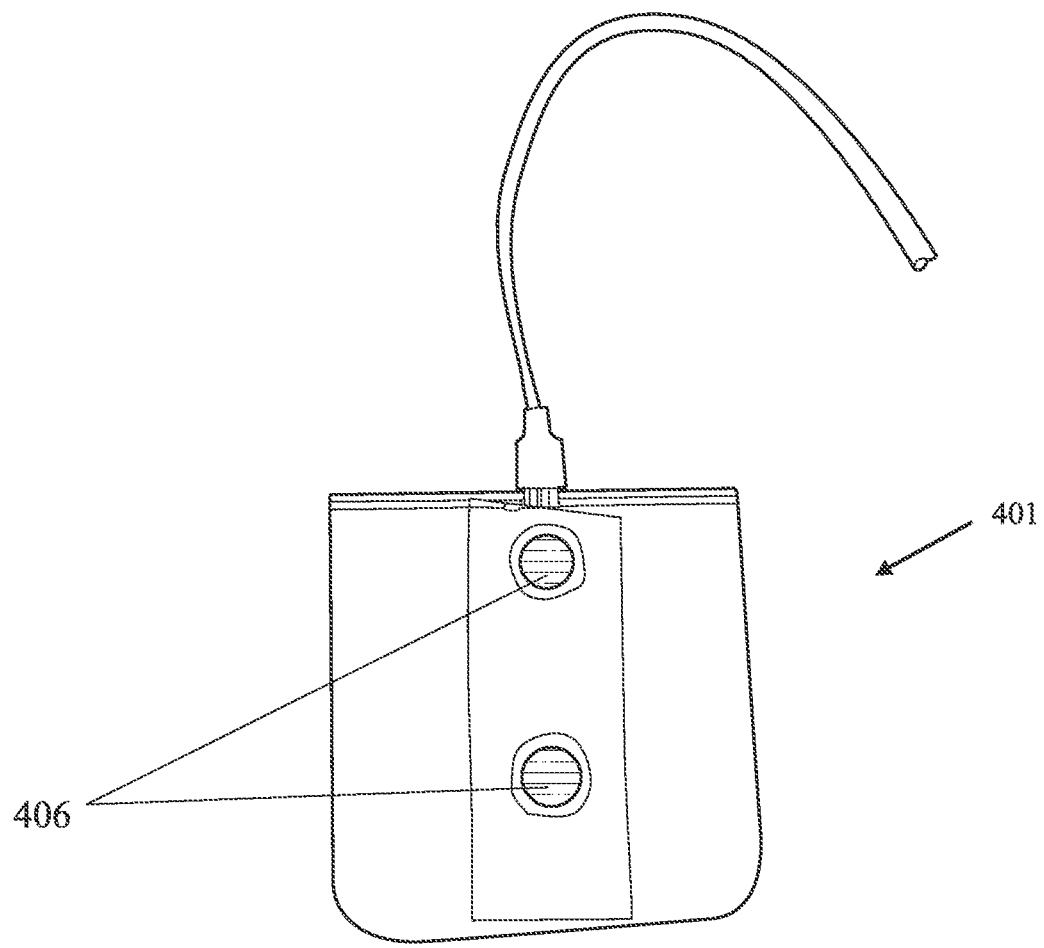
FIGS. 4A-4B show examples of a bottom view of the light panel, according to an aspect.
Figure 4B:
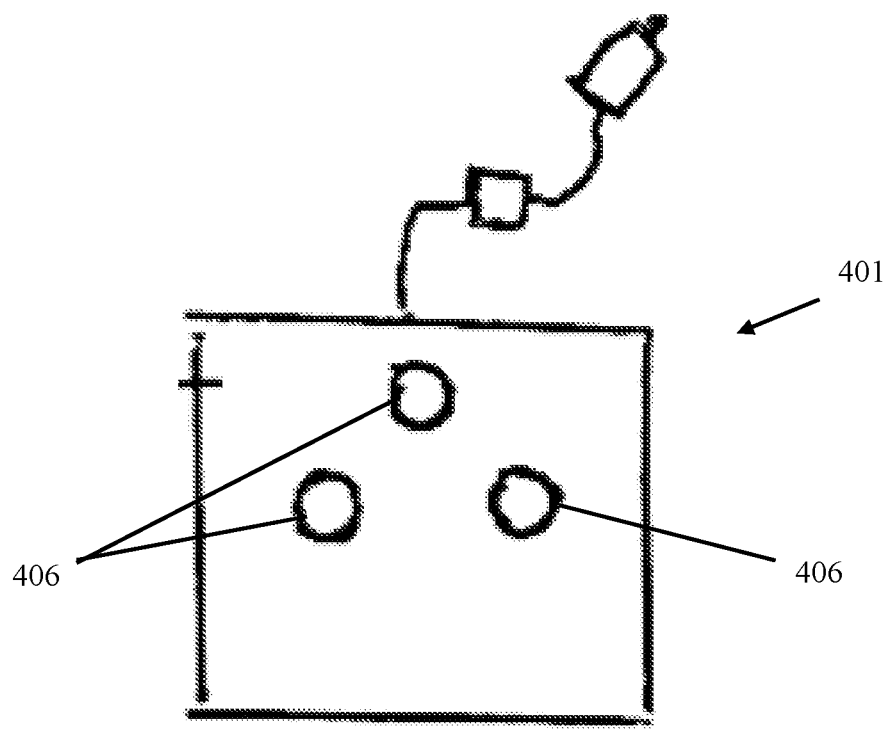

FIGS. 4A-4B show examples of a bottom view of the light panel 401, according to an aspect. Magnets 406 may be visible on the bottom side of the light panel 401. As shown as an example in FIG. 4A, the light panel 401 may be provided with two magnets 406. As shown as another example in FIG. 4B, the light panel 401 may be provided with three magnets 406. A handle having corresponding magnets and magnet placement may be used with the panel 401, such that the magnets of the handle are aligned with the magnets of the panel.

In an example, as shown in FIG. 4A, the magnets may be placed in a linear configuration. The placement of magnets 406 in the handle 402 would correspond to the placement of magnets 406 in the light panel 401, which may allow for the handle 402 and light panel 401 to magnetically attract through the car windshield. For example, the outward facing sides of the magnets 406 on both the handle 402 and the light panel 401 would have opposing poles to ensure the handle and the panel are attracted to each other. Each pair of magnets, one from the handle and one from the panel, may have their opposing poles face each other to allow for them to attract through the windshield and ensure the strong magnetic connection.

Figure 4C:
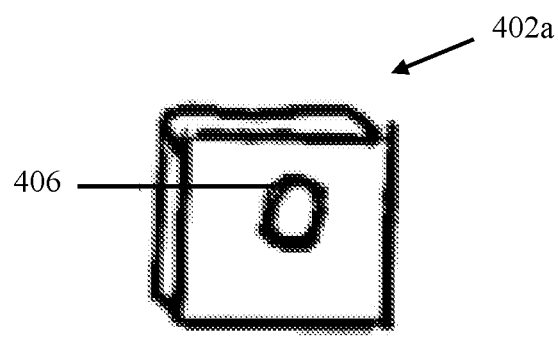
FIG. 4C shows a bottom view of a handle having one magnet, according to an aspect.

FIG. 4C shows a bottom view of a handle ("single magnet support handle," "one magnet handle") 402a having one magnet 406, according to an aspect. The handle 402a having one magnet 406 may be used in conjunction with the handle 402 with two magnets 406. Using the two separate pieces as a handle may allow for the light panel 401 to stay attached if the user misaligns the handle 402 and the panel 401 because the one magnet handle 402a is still connected to the panel 401. The single magnet support handle 402a may be used on the light panel 401 shown in FIG. 4B. Thus, the light panel 401 shown in FIG. 4B may have a handle 402 attached to the pair of magnets and the single magnet support handle 402a may be attached to the third magnet 406.

In another example, a handle 402 having three magnets 406 may be used with a panel 401 having three magnets, such as the example shown in FIG. 4B. The magnets 406 may, for example, be visible on the bottom side of the handle 402 as shown, prior to the handle being covered in a fabric or felt covering, such as the cover shown by 308 in FIGS. 3B-3C. The panel in FIG. 4B, for example, may have exemplary measurements of 4 inches in width and 6 inches in length. The handle 402, as shown as an example in FIG. 4C, may also have a length of 6 inches such that the magnets of the handle 402 correspond to and align with the magnets of a panel having a similar length. The panel 401 may have a thickness similar to that of a standard credit card, for example. An advantage may be that the magnets attached to the handle 402 may more easily be magnetically attracted to and attached to the magnets on the bottom side of the panel 401, when the handle is associated with the top side of the panel 401. It should be understood that the panel 401 may be provided with any other suitable dimensions as well.

Figure 5:
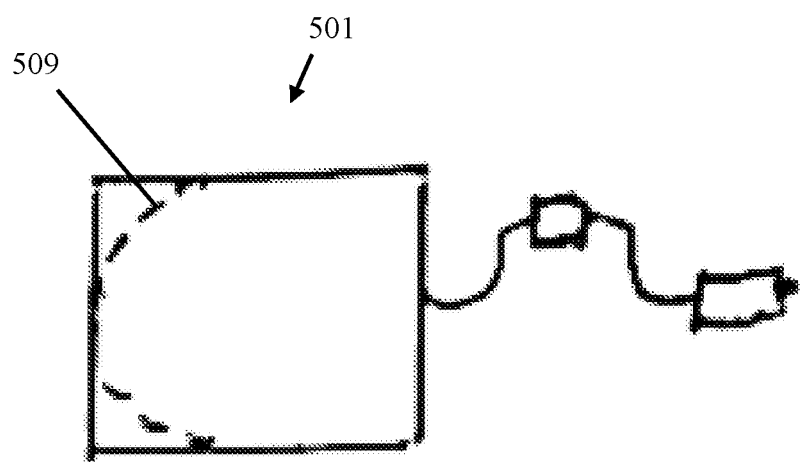
FIG. 5 show a top view of the light panel having a pointed corner and having a rounded, oblong shape, according to an aspect.

FIG. 5 shows the light panel 501 with a dotted line 509. The light panel 501 may be cut along the dotted line 509 to form a rounded edge of the light panel 501. The smaller and circular edge 509 of the light panel 501 may allow for the light panel to navigate tight corners more easily. In another example, the light panel 501 may be cut into oblong shape and a pointed tip. The panel 501 may be provided with a variety of shapes and sizes, such that a suitable light panel 501 can be used for different types of automobile windows. For example, the user may have more than one panel available to use the different panels for the variety of shaped and sized windshields. The vehicle's windshields may have a different radius for the front windshield and back windshield and the upper and lower corners of the windshield. Because many automobiles may have windows and windshields with rounded edges, the panel 501 may be provided with rounded corners 509 and also a smaller, pointed corner for fitting into smaller spaces or crevices. Thus, the panel 501 may be able to provide light to such areas. In another example, the shape of the panel 501 may be rounded, elongated, or oblong in order to more easily fit into smaller areas, corners, or edges of a window or other glass.

It should also be understood that the panel 501 may be cut into or provided in any suitable shape or size. An advantage may be that the panel 501 may be customized to fit a user's needs by conforming to the edge of any particular vehicle window, such as a rounded corner of a windshield or window, or a curved edge of a windshield or window. Another advantage may be that a round panel or a panel having rounded corners may be less susceptible to snagging on any obstructions that may be present.

For example, a variety of different handle shapes may be used such as an L-shaped handle may be used. In another example, a half-dome handle may be used. The L-shaped handle may be provided with magnets on the bottom side, and may, as an example, be provided with five magnets. The L-shaped handle may allow for a better hold on elongated or rounded panels, for example. As another example, the handle may be provided in a half-dome shape, such that a user may grip the handle more easily at the top dome portion, while the end of the handle is magnetically attracted to the panel. Furthermore, the magnets may thus be located within the ends of the half-dome handle. Handles may be provided in a variety of shapes and sizes such as the examples shown in FIGS. 3A-3C.

An advantage may be that a user may select any suitable handle appropriately sized and shaped for their needs, which may contain magnets aligning with a particular panel that is sized to conform to a particular car window or windshield. Another advantage may be that these shaped handles prevent obstruction of light by the handling of a user. An advantage may also be that various kinds of handles may be mixed and matched with various shapes and sizes of panels, such that a user may select a combination of panels and handles according to their needs, which may change according to the type of car or other vehicle for which a light source is desired, such as during the cutting of tinted window film, or any other maintenance or detailing process. Additionally, it should be understood that the shape and size of the handle is as such to not cover the guideline and for the guideline not to be blocked by the user's hand while they are using the system.

Figure 6:
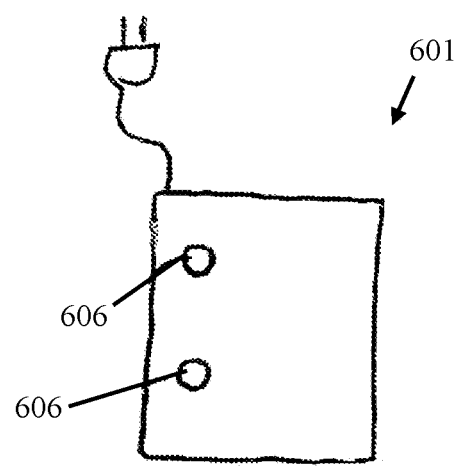
FIG. 6 shows a bottom view of the light panel, according to an aspect.

FIG. 6 shows a bottom view of the light panel 601, according to an aspect. In an example, the magnets 606 may be attached to the side of the light panel 601. The magnets 606 may be attached to the light panel 601 by a clear polyurethane film, for example. The positioning of the magnets 606 may depend on the rigidness of the light panel 601. For example, having a more rigid light panel 601 may mean the magnets 606 may be placed closer to an edge because the rigid light panel 601 may not need as much support. In another example, having a more flexible light panel 601 may mean the magnets 606 may need to be positioned centrally to allow the light panel 601 to stay rigid enough to be flush against the windshield during use.

In an example, the light panel 601 may have holes, which may provide a space for the insertion of a magnet holder, for example. A magnet holder may be associated with the panel 601 by being inserted or fitted into the holes or grooves on the light panel. An advantage may be that the magnets 606 may be removable from the system. As an example, the magnet holder may be constructed or manufactured by injection molding, or any other suitable process. In an example, a magnet holder that may be used with the magnetic light panel system. The magnet holder may be used to house magnets and next, be associated with a panel, such that the panel of a magnetic light panel system can be magnetized. As a possibility, the magnet holder may be attached to the light panel system using a clear polyurethane film.

Figure 7A:
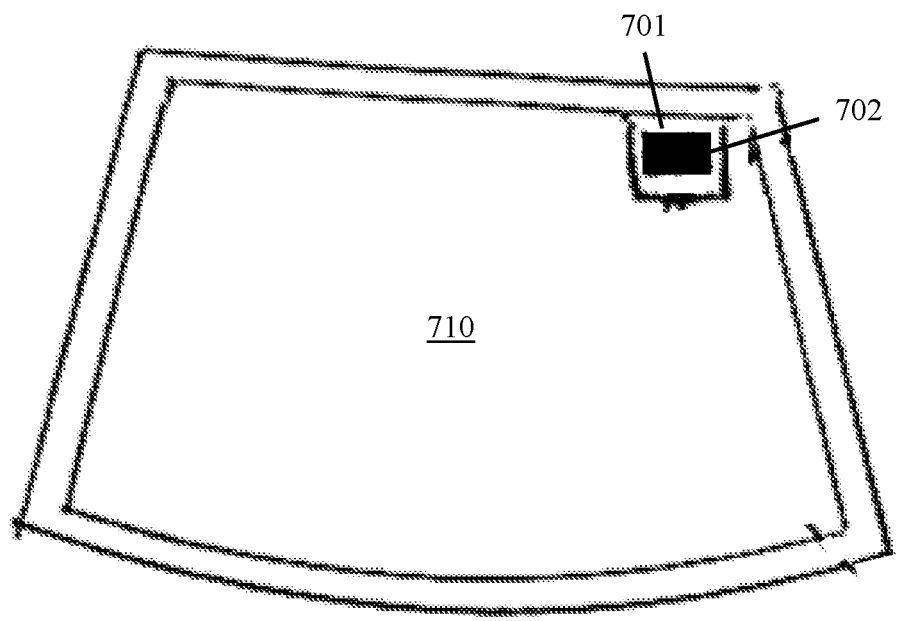
FIGS. 7A-7B show a front view and a front perspective view, respectively, of a vehicle windshield having a light panel mounted to an interior side of the windshield, according to an aspect.
Figure 7B:
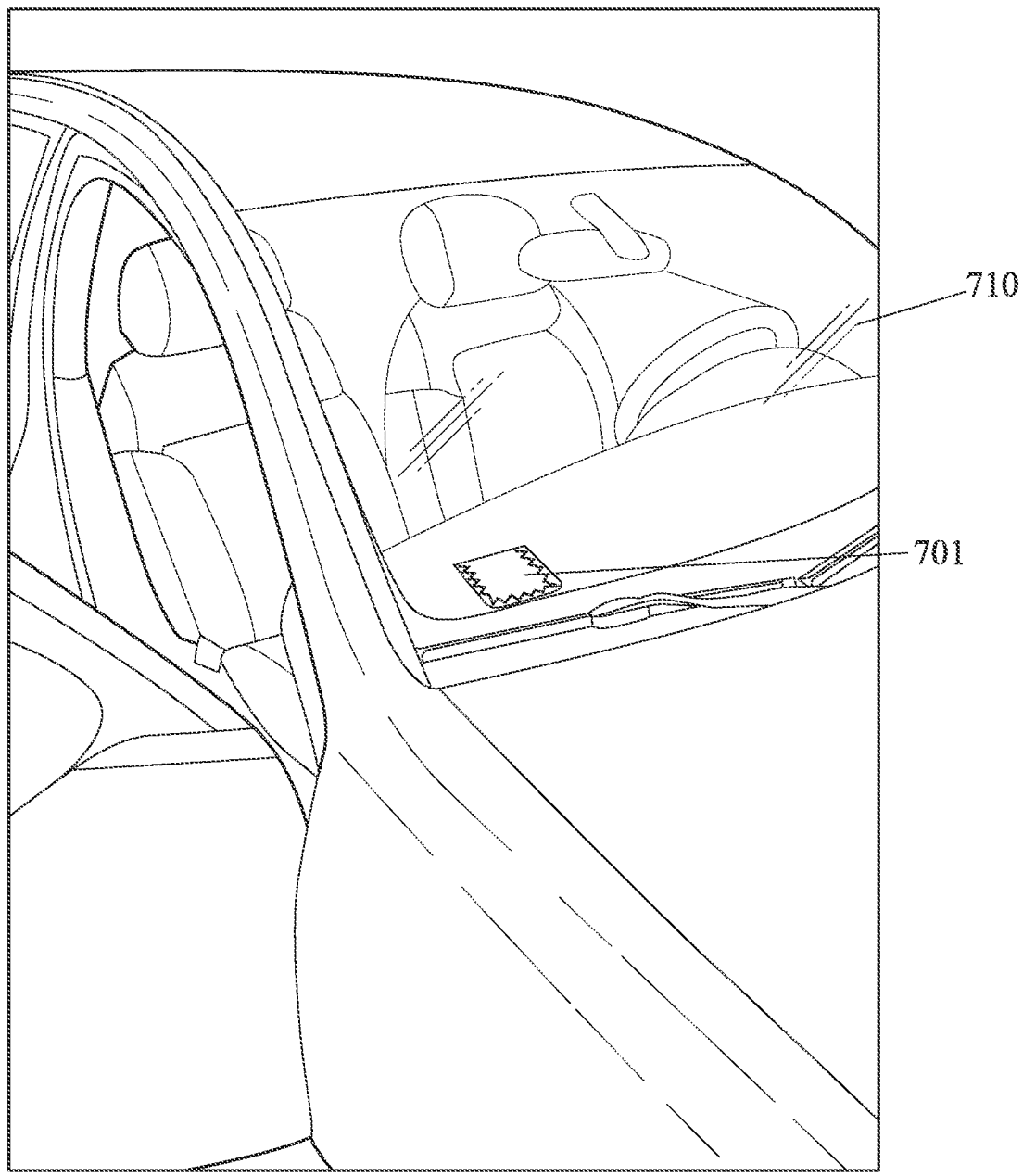

FIGS. 7A-7B show a front view and a front perspective view, respectively, of a vehicle windshield 710 having a light panel 701 mounted to an interior side of the windshield 710, according to an aspect. It should be understood that the panel 701 may be snugly fitted into the sides or edges of the windshield 710 in order to hold the panel against the windshield, or the panel may be mounted against the windshield using any other suitable method. When the panel 701 is placed on the interior side of the windshield 710, the handle 702 may be placed on the exterior side of the windshield 710 in order to manipulate and move the panel via the magnetic attraction between the panel 701 and the handle 702.

Figure 8A:
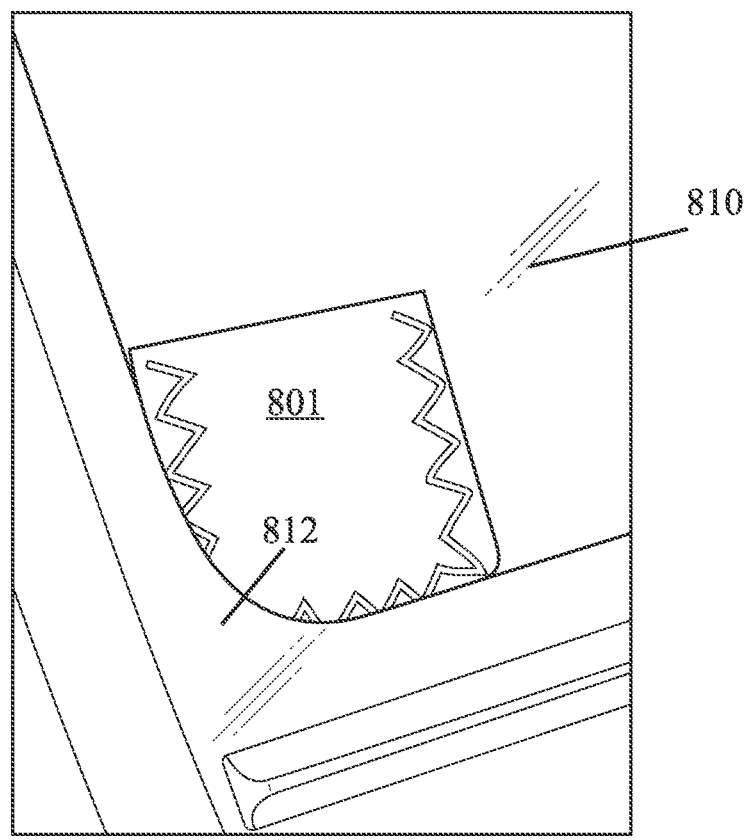
FIGS. 8A-8B show a top view of the light panel on the interior side of a car windshield in an unlit state, and in a lit state, respectively, according to an aspect.
Figure 8B:
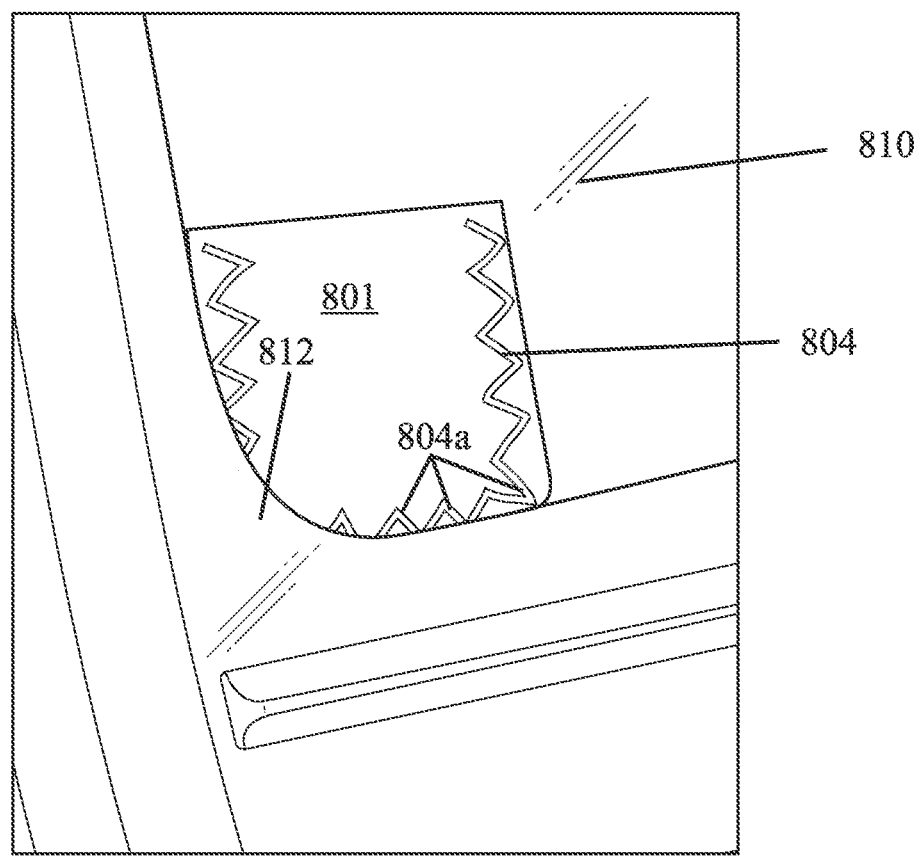

FIGS. 8A-8B show a top view of the light panel 801 on the interior side of a car windshield 810 in an unlit state, and in a lit state ("lit state," or "illuminated state"), respectively, according to an aspect. The panel 801 may be plugged directly to the vehicle, or any other suitable power source, in order to be powered and illuminated. As shown in FIG. 8B, the illumination may provide a light source to the user such that the edges of the vehicle windshield are easier to see while cutting window film, or performing any other similar maintenance or detailing task, for example. Because the windows and windshield of a vehicle may be provided with a black matrix 812 along their borders, it may be difficult for a user to visualize where a window tinting film should be cut without a proper light source. The light panel 801 may provide a light source along the black matrix 812, which may allow for more precise cutting. The illumination of the panel 801 may also more clearly show the guideline 804, which may assist the user in seeing the depth of the window edge and help the user to determine where cuts on a window film need to be made. The guideline 804 may also help the user to cut in straight lines where necessary. The points 804a of the guideline 804 may allow the user to see the depth of a window edge, or where a straight line should be cut, for example.

Furthermore, the points 804a of the guideline 804 may, for example, form a dotted line guide for cutting the tint film. The guideline 804 also is a different shade than the panel to provide more contrast between the panel and the guideline 804, which may allow the user to have better visibility when cutting. Additionally, the illumination of the panel 801 may help to expose any obstructions along the border of the window that a user may need to accommodate for, repair, or remove while applying the window tint film.

Figure 9A:
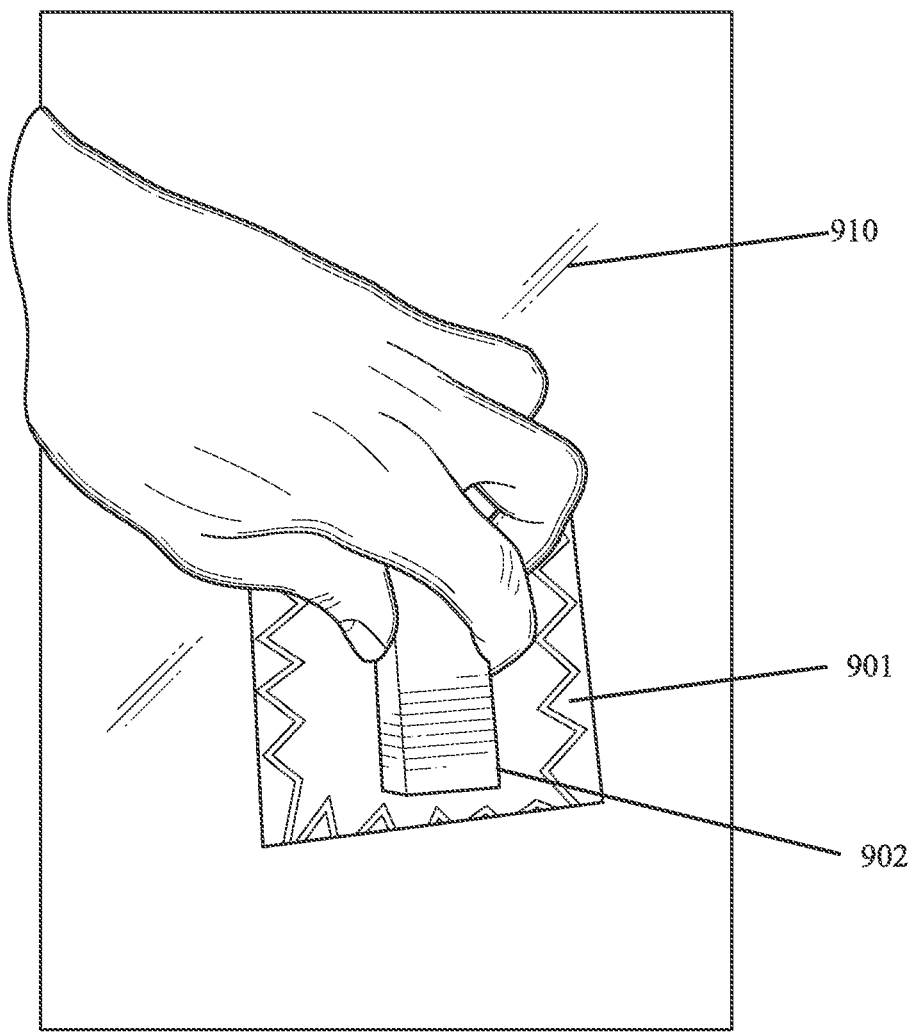
FIGS. 9A-9B show a top view of a user holding a handle to manipulate a panel under a windshield, and a top view of a handle placed on a windshield to magnetically attract a panel, respectively, according to an aspect.
Figure 9B:
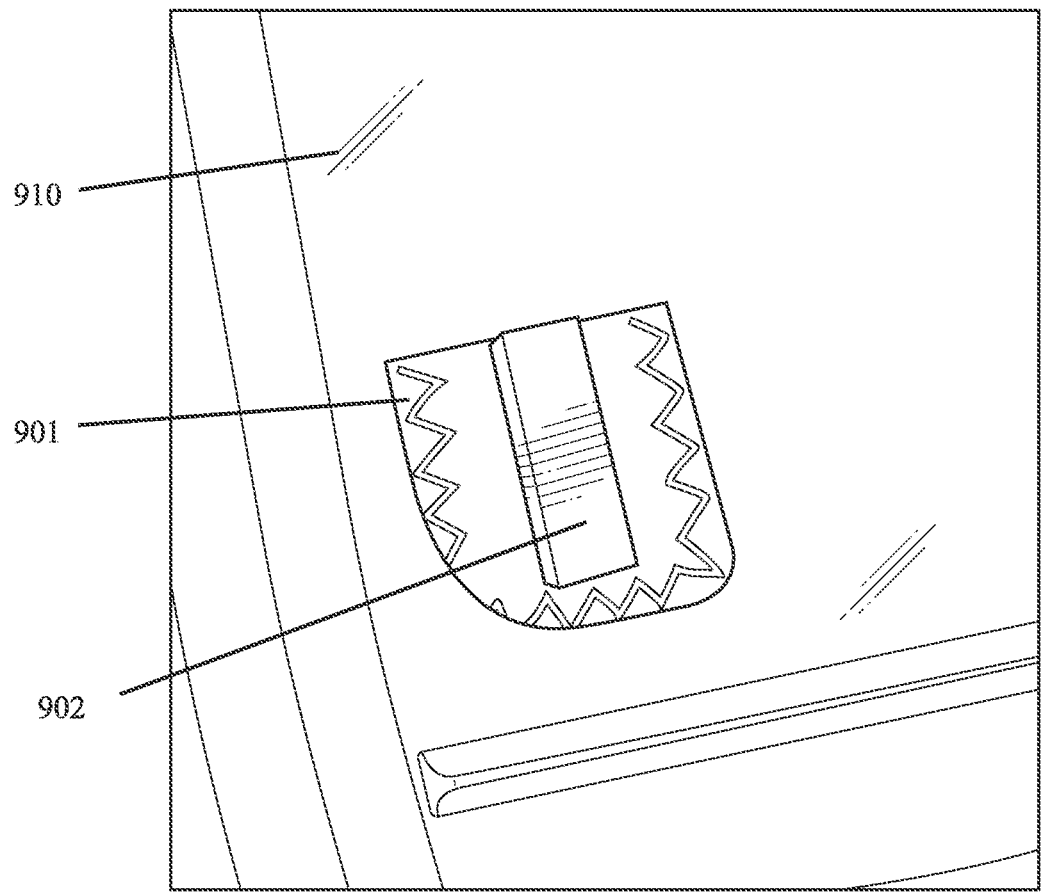

FIGS. 9A-9B show a top view of a user holding a handle 902 to manipulate a panel 901 under a windshield 910, and a top view of a handle 902 placed on a windshield 910 to magnetically attract a panel 901, respectively, according to an aspect. With a panel 901 placed on the vehicle interior side of a windshield 910, the light provided by the panel 901 may be used to assist a user performing a task such as cutting window tinting film. Because the window film may be placed on the vehicle exterior side of the windshield during cutting, and the panel 901 may be placed on the opposite side of the glass, the panel 901 may freely move around without disrupting the window film, for example. When the user needs to manipulate or move the panel 901 to provide light to other areas, the handle 902 may be used to magnetically attract the panel 901 and move the light source to any desired location. As shown in FIG. 9B, the handle 902 may also be used to hold the panel 901 in place such that a user's hands may be free to work on a task such as cutting film. Another advantage is that a second person's assistance may no longer be needed for providing a light source during such work. Another advantage of the system may be that the cover (as shown by 308 in FIGS. 3B-3C), again, may protect the glass of the car and help to prevent scratches or any other damage from the handle 902 being skimmed across the surface of the windshield 910 or other windows.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A magnetic light panel system comprising:
   a light panel having a first magnet, wherein the light panel is adapted to illuminate when connected to a power source, and wherein the light panel can be cut and adjusted to different sizes;
   a handle having a top surface and a bottom surface opposite the top surface, and a second magnet embodied within the handle such that a most outer edge of the magnet is flush with the bottom surface or above the bottom surface;
   wherein the first magnet and the second magnet are adapted to be attracted to each other; and
   wherein the light panel and the handle are adapted to be magnetically associated with each other from opposite sides of a vehicle windshield, while the light panel and the bottom surface of the handle are simultaneously sliding along the windshield.

2. The magnetic light panel system of claim 1, wherein the light panel is an electroluminescent panel.

3. The magnetic light panel system of claim 1, wherein the light panel further comprises a guideline, the guideline being a zigzag line around an exterior edge of the light panel.

4. The magnetic light panel system of claim 1, wherein the light panel is adapted to be connected to the power source by a power cord.

5. The magnetic light panel system of claim 4, wherein the power cord is adapted to plug into a car cigarette lighter outlet.

6. The magnetic light panel system of claim 1, wherein the handle has a soft material layer on the bottom surface.

7. A method of applying a tint to a vehicle's window comprising the steps of:
   receiving a magnetic light panel system having a light panel with a first magnet, a corresponding handle with a second magnet, wherein the first magnet and the second magnet are adapted to be attracted to each other;
   applying a tinting film over the vehicle's window;
   placing the light panel on an interior side of the vehicle's window;
   placing the corresponding handle on an exterior side of the vehicle's window;
   illuminating a car windshield with the magnetic light panel system;
   adjusting the light panel of magnetic light panel system around an exterior edge of the vehicle's window; and
   trimming the tinting film along the exterior edge of the vehicle's window.

8. The method of claim 7, wherein the light panel is powered by plugging a power cord into a vehicle.

9. The method of claim 7, wherein the light panel is formed by cutting the panel into a selected shape.

10. The method of claim 7, wherein the handle and light panel are adjusted by the user moving the handle and the attached panel around an exterior edge of the vehicle's window.

11. The method of claim 7, wherein the light panel is gliding across the interior side of the vehicle's window.

12. A magnetic light panel system comprising:
    a light panel having a first magnet and a top surface, the top surface having a guideline, wherein the light panel is adapted to illuminate when connected to a power source;
    a handle, the handle having a second magnet;
    wherein the first magnet and the second magnet are adapted to be attracted to each other; and
    wherein the light panel and the handle are adapted to be magnetically associated with each other from opposite sides of a vehicle windshield, while the light panel and the handle are simultaneously sliding along the windshield.

13. The magnetic light panel system of claim 12, wherein the light panel is adapted to have a battery pack as the power source.

14. The magnetic light panel system of claim 12, wherein the handle has a soft fabric cover.

15. The magnetic light panel system of claim 12, wherein the guideline is a jagged shape along an exterior edge of the light panel.

16. The magnetic light panel system of claim 12, wherein the handle is on an exterior side of the vehicle's windshield and the light panel is on an interior side of the vehicle's windshield.

* * * * *